Aug. 27, 1946.    R. LEE    2,406,389
ELECTRIC MOTOR
Filed Nov. 30, 1942
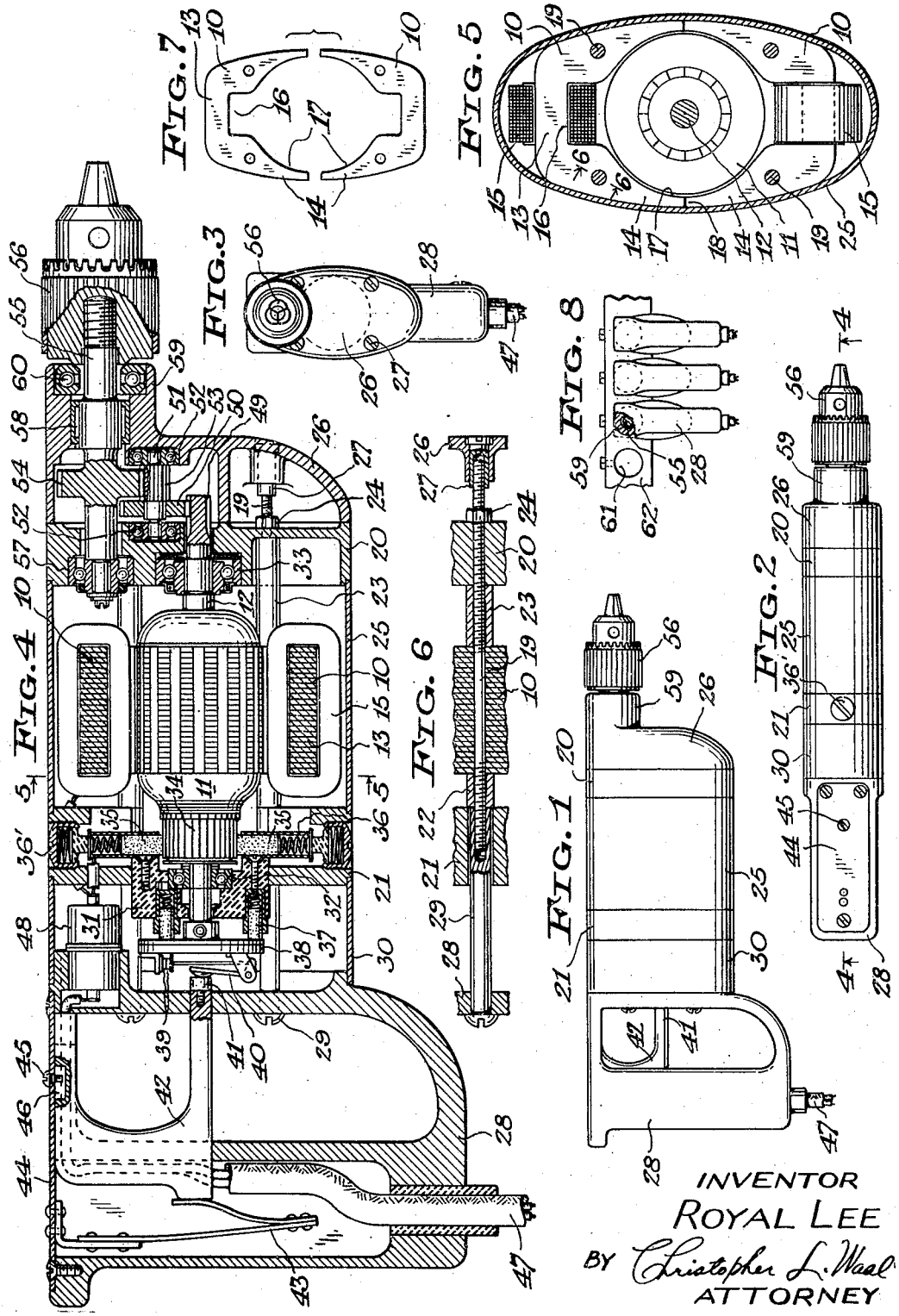
INVENTOR
ROYAL LEE
BY Christopher L. Waal
ATTORNEY Patented Aug. 27, 1946

2,406,389

UNITED STATES PATENT OFFICE 2,406,389

ELECTRIC MOTOR

Royal Lee, Milwaukee, Wis., assignor to Lee Engineering Research Corporation, Milwaukee, Wis., a corporation of Wisconsin Application November 30, 1942, Serial No. 467,336

2 Claims. (Cl. 172—36)

The present invention relates to electric motors and to rotary tools embodying the same.

An object of the invention is to provide an improved and efficient electric motor adapted for incorporation in a power tool, such as a portable drill, the motor being so constructed and arranged as to be relatively compact in a transverse dimension for permitting use of the tool in confined spaces.

Another object is to provide an electric motor having an improved stator structure which affords short and efficient magnetic circuits.

A further object is to provide a portable motor-driven tool having simple and easily manipulated means for controlling the motor speed.

The invention further consists in the several features hereinafter described and claimed.

In the accompanying drawing,

Fig. 1 is a side elevation of a motor-driven drilling tool constructed in accordance with the invention;

Fig. 2 is a top view of the tool;

Fig. 3 is a front end view of the tool;

Fig. 4 is a longitudinal sectional elevation of the tool and motor thereof, taken generally along the line 4—4 of Fig. 2;

Fig. 5 is a transverse sectional elevation of the tool and motor thereof, taken generally along the line 5—5 of Fig. 4;

Fig. 6 is a detail sectional view taken generally along the line 6—6 of Fig. 5;

Fig. 7 is a detail view of associated field laminations for the motor, and

Fig. 8 is a top view of a multiple tool mounting.

Referring to the drawing, the electric motor for the tool comprises a magnetizable stator core, preferably of laminated construction and formed by complementary half-sections 10, and a co-operating rotor or armature 11 carried on a shaft 12. The stator core is in the form of an elongated loop, preferably of generally elliptical shape and truncated at both ends. Each half-section 10 of the stator core is U-shaped, as seen in Figs. 5 and 7, and has a yoke portion 13 and curved legs 14 diverging from the yoke portion and tapering toward their ends. The yoke portion of each core section carries a magnetizing winding or field coil 15 which is accommodated within a notch 16 formed at the inner side of the core section. The two field coils are substantially identical, and in the case of the two-pole motor illustrated these coils are so arranged that the adjacent legs of the two stator core sections have the same polarity. The stator core legs have concave inner sides 17 forming pole faces adjacent to the rotor, these pole faces being chamfered near the field coils. The assembled stator core presents opposed consequent poles each of which is formed by adjacent legs of the two stator sections. The free end portions of the core legs are relatively thin and the aligned extremities of the adjacent legs are in proximity to each other at the polar axis, the legs being either in abutment or separated a short distance by an intervening air gap or by interposed non-magnetic material, such as insulation 18, Fig. 5. The insulation may be varnish coatings, or strips of insulating material, or merely the oxide coating of the stator laminations. In any case, there is a region of high reluctance between the relatively thin ends of the stator core legs, so that the two parallel magnetic circuits through the stator core sections are more or less independent of each other, and it is unnecessary to effect critical adjustment of the number of turns in the two field coils. The high reluctance between the ends of the stator core legs also reduces twisting or distortion of the field by armature reaction. The shape and arrangement of the stator core result in short and efficient magnetic circuits and make it possible to obtain the desired magneto-motive force with relatively small and compact field coils and with relatively few turns in the coils. The overall width of the stator core in the direction of the polar axis is only slightly larger than the diameter of the rotor.

The electric motor is preferably of the variable speed series or universal type operable on both direct current and alternating current, but in some instances the motor may be of other types, such as shunt, compound, repulsion, induction, and synchronous.

The laminated stator core sections are carried by studs or rods 19 extending through the legs of the sections parallel to the motor shaft and secured to end frame members 20 and 21 of elliptical shape, each stud having a sleeve nut 22 between the core section and the frame member 21 and a sleeve 23 (which may also be a nut) between the core section and the frame member 20. Each stud also has a clamping nut 24 bearing on the frame member 20. Each of the frame members 20 and 21 has a width in the plane of the polar axis slightly larger than the diameter of the armature. A thin non-magnetic casing member or shell 25 of narrow elliptical shape fits snugly around the assembled stator core sections, and at its ends the casing member fits into rabbeted marginal portions of the end frame members, the casing member being flush with these frame members. The casing member 25 is preferably of metal, although in some instances other materials, such as hardened plastics, may be used.

A gear casing 26 is secured to the front frame member 20 by sleeve nuts 27 engaging the studs 19, the gear casing being of elliptical shape, as seen in Fig. 3. A loop-shaped handle 28 has an elliptical front portion secured to the rear frame member 21 by sleeve nuts 29 engaging the studs 19, there being a short elliptical casing member or shell 30 interposed between the handle and this frame member to form a governor chamber. The handle includes at its rear a hollow handgrip portion which extends transversely of the projected axis of the rotor.

The rear frame member 21 carries an insulating block 31 supporting therein a ball bearing 32 for the rear end of the motor shaft 12, and the front frame member 20 supports therein a ball bearing 33 for the front end of the motor shaft. The armature has a commutator 34 on which bear opposed spring-pressed brushes 35 slidable in tubular brush holders 36, the latter being secured to the insulating block and extending along the major axis of the narrow elliptical frame member 21. Screw plugs 36' are secured in the frame member 21 for access to the brushes. The insulating block also carries spring-pressed brushes 37 for a suitable speed governor 38 mounted on the adjacent end of the motor shaft, the brushes 37 extending parallel to the shaft axis. The governor may be of the general type shown in my Patent No. 1,767,146, dated June 24, 1930. The governor includes separable spring-mounted contacts 39 and a speed-adjusting lever 40, the latter having a free end portion at the axis of the motor and being actuated by an axially extending stem 41 forming part of a finger-operated control member 42 slidably mounted in the front and rear portions of the handle. The control member is urged to motor-stopping position by a leaf spring 43 housed in the hollow grip portion of the handle and is manually retractable, in the manner of a trigger, against the action of the spring to start the motor and to effect an increase in motor speed. In some instances, the governor contacts may form a motor-stopping switch. The leaf spring 43 is carried by a top plate 44 detachably secured to the handle. A screw 45 is secured to the top plate and extends into a slot 46 in the control member to guide and limit the travel of the control member.

The handle 28 has electric supply conductors 47 attached to its lower end, these conductors being connected to the motor windings through a detachable connector plug 48.

The front end of the motor shaft has a pinion 49 which extends in the gear casing 26 and which meshes with a gear 50 on an intermediate shaft 51, the latter being supported by ball bearings 52 in the frame member 20 and gear casing 26. The intermediate shaft has a pinion 53 which meshes with a gear 54 on a chuck shaft 55, the latter having a chuck 56 at its front end to receive a drill or other tool element. The chuck shaft is supported by a ball bearing 57 in the frame member 20 and by a roller or needle bearing 58 mounted in a cylindrical projection 59 of the gear casing, there being a ball bearing 60 in the projection to resist axial thrust on the shaft.

In operation, the motor-driven tool is held and guided by the handle 28, and the speed of the motor is adjusted by manually pressing the governor control member 42 rearwardly so as to permit the drill or other tool element to rotate at the desired speed and to avoid damage to the tool element by excessive speed. As the casing or housing of the tool is relatively narrow, being only slightly wider than the rotor diameter, the tool can readily be inserted into narrow or confined spaces.

Because of the high efficiency of the motor, it is ordinarily unnecessary to provide for ventilation of the motor, thus avoiding the use of air openings in the casing portion of the motor.

For certain tool operations, a number of the rotary tools may be arranged in a group or battery, as indicated in Fig. 8, in which event the parallel chuck shafts of the tools can be brought relatively close together because of the narrowness of the tool housings. The tools may be mounted in any suitable manner, as by clamping the gear casing projections 59 in respective openings 61 formed in a support 62.

While the invention particularly relates to electric motor structures and to rotary power tools incorporating the same, certain features of the invention are also applicable generally to dynamo-electric machines.

What I claim as new and desire to secure by Letters Patent is:

1. In an electrically-operated tool, a housing, a variable-speed motor in said housing having a magnetizable stator and a tool-driving rotor, said housing having a frame member adjacent to an end of said rotor, a handle secured to said frame member, a speed-responsive governor for the motor disposed between said frame member and handle, and a manually operable speed-setting actuator for the governor shiftably mounted in said handle, said handle having a hand-grip and a hand-receiving opening in front of said hand-grip, and said actuator having a finger-operated trigger portion within said opening.

2. In a dynamo-electric machine, the combination of a stator, a rotor cooperating therewith and having a commutator and a shaft, speed-responsive switch means having a current-conducting rotary member carried by said shaft, an insulating block interposed between said commutator and rotary member, said rotor shaft being journalled in said block, brush means for said commutator carried by said block at one side of said block, and brush means for said rotary member carried by said block at the other side of said block.

ROYAL LEE.